United States Patent
Wojciechowski et al.

(10) Patent No.: US 7,383,624 B2
(45) Date of Patent: Jun. 10, 2008

(54) SELF-PIERCING FEMALE FASTENER, METHOD OF FORMING A SEALED FEMALE FASTENER AND PANEL ASSEMBLY AND PANEL ASSEMBLY

(75) Inventors: Stanley E. Wojciechowski, Lancaster, CA (US); John M. Parker, Ann Arbor, MI (US)

(73) Assignee: Whitesell International Corporation, Taylor, MI (US)

( * ) Notice: Subject to any disclaimer, the term of this patent is extended or adjusted under 35 U.S.C. 154(b) by 0 days.

(21) Appl. No.: 10/501,366

(22) PCT Filed: Dec. 16, 2002

(86) PCT No.: PCT/US02/40278

§ 371 (c)(1),
(2), (4) Date: Mar. 1, 2005

(87) PCT Pub. No.: WO03/062651

PCT Pub. Date: Jul. 31, 2003

(65) Prior Publication Data

US 2005/0147481 A1     Jul. 7, 2005

(51) Int. Cl.
*B21D 39/00* (2006.01)
(52) U.S. Cl. ............... 29/521; 29/505; 29/520; 29/523; 29/525; 411/179; 411/180; 411/183
(58) Field of Classification Search ............ 29/505, 29/520, 521, 523, 525, 522.1; 470/18–21, 470/25, 26, 87, 89, 91, 197; 411/177, 179, 411/180, 181, 183, 187, 188
See application file for complete search history.

(56) References Cited

U.S. PATENT DOCUMENTS

| | | | |
|---|---|---|---|
| 1,112,525 A | 10/1914 | Darling | |
| 1,919,552 A | 7/1933 | Hasselquist | |
| 3,213,914 A | 10/1965 | Baurnle et al. | |
| 3,253,631 A | 5/1966 | Reusser | |
| 3,282,315 A | 11/1966 | Zahodiakin | |
| 3,299,500 A * | 1/1967 | Double | 29/432.2 |
| 3,469,613 A | 9/1969 | Steward | |
| 3,648,747 A | 3/1972 | Steward | |
| 3,736,969 A | 6/1973 | Warn et al. | |
| 3,810,291 A | 5/1974 | Ladouceur | |
| 3,878,599 A | 4/1975 | Ladouceur et al. | |

(Continued)

FOREIGN PATENT DOCUMENTS

EP     0 561 715 A1     3/1993

(Continued)

*Primary Examiner*—David P. Bryant
*Assistant Examiner*—Christopher M Koehler
(74) *Attorney, Agent, or Firm*—Howard & Howard Attorneys, P.C.

(57) ABSTRACT

Method of forming a sealed joint between a nut (20) having a cylindrical pilot (22), an annular flange portion (28) surrounding the pilot and a re-entrant groove (32) and a panel with a die having an annular lip (62) which deforms a panel portion into the groove (32) and simultaneously shaves an outer surface of the pilot onto the panel. The annular groove in the flange portion includes an arcuately inclined outer side wall (36) and an inner side wall (38) arcuately inclined toward the flange portion.

6 Claims, 4 Drawing Sheets

U.S. PATENT DOCUMENTS

| | | |
|---|---|---|
| 3,910,331 A | 10/1975 | Randall |
| 4,389,766 A | 6/1983 | Capuano |
| 4,432,681 A | 2/1984 | Capuano |
| 4,470,736 A | 9/1984 | Tasseron |
| 4,543,023 A | 9/1985 | Capuano |
| 4,627,776 A | 12/1986 | Pamer et al. |
| 4,637,766 A | 1/1987 | Milliser |
| 4,708,556 A | 11/1987 | Pamer et al. |
| 4,893,976 A * | 1/1990 | Milliser et al. ............. 411/180 |
| 5,251,370 A | 10/1993 | Muller et al. |
| 5,302,066 A | 4/1994 | Bieschke et al. |
| 5,335,411 A | 8/1994 | Muller et al. |
| 5,340,251 A | 8/1994 | Takahashi et al. |
| 5,423,645 A | 6/1995 | Muller et al. |
| 5,509,766 A | 4/1996 | Leuschner |
| 5,531,552 A | 7/1996 | Takahashi et al. |
| 5,549,430 A | 8/1996 | Takahashi et al. |
| 5,613,815 A | 3/1997 | Muller |
| 5,782,594 A | 7/1998 | Muller |
| 5,882,159 A * | 3/1999 | Muller ....................... 411/179 |
| 6,004,087 A | 12/1999 | Muller |
| 6,081,994 A * | 7/2000 | Muller ....................... 29/798 |
| 6,125,524 A | 10/2000 | Mueller |
| 6,220,804 B1 | 4/2001 | Pamer et al. |
| 6,257,814 B1 | 7/2001 | Muller |
| 6,276,040 B1 * | 8/2001 | Muller ....................... 29/432.2 |
| D448,659 S | 10/2001 | Pamer et al. |
| 6,318,940 B1 | 11/2001 | Mitts |
| D457,054 S | 5/2002 | Pamer et al. |
| 6,409,444 B2 | 6/2002 | Pamer et al. |
| 6,543,979 B2 | 4/2003 | Iwatsuki |
| 2001/0010789 A1 | 8/2001 | Pamer et al. |
| 2002/0159858 A1 | 10/2002 | Ikami et al. |
| 2002/0172573 A1 | 11/2002 | Pamer et al. |
| 2002/0182032 A1 | 12/2002 | Anderson et al. |
| 2003/0039530 A1 | 2/2003 | Ross et al. |

FOREIGN PATENT DOCUMENTS

| | | |
|---|---|---|
| EP | 0 864 766 B1 | 3/2004 |

* cited by examiner

SELF-PIERCING FEMALE FASTENER, METHOD OF FORMING A SEALED FEMALE FASTENER AND PANEL ASSEMBLY AND PANEL ASSEMBLY

FIELD OF THE INVENTION

This invention relates to a method of forming a sealed female fastener and panel assembly, the resultant sealed female fastener and panel assembly and a self-piercing or clinching female fastener element which may be formed by conventional cold forming techniques having a round or generally cylindrical pilot portion, an annular flange portion surrounding the pilot portion and an annular re-entrant groove in the flange portion, wherein the pilot portion is shaved during installation by a die member forming an integral annular portion deformed against an inner portion of the panel portion which is deformed into the re-entrant groove.

BACKGROUND OF THE INVENTION

Self-attaching female fastener elements including pierce and clinch nuts were developed by Multifastener Corporation, the predecessor in interest of the Assignee of this application. Pierce and clinch nuts are generally installed in a metal panel in a die press which may also be utilized to form the panel, wherein an installation head is installed in one die shoe or platen of the die press, generally the upper die shoe, and a die member or die button is installed in the other die shoe, generally the lower die shoe. The installation head receives the self-attaching fasteners and the fasteners are then installed by a reciprocating plunger in the installation head with each stroke of the die press. U.S. Pat. Nos. 3,187,769, 3,648,747 and 3,711,931, all assigned to the Assignee of the predecessor in interest of the Assignee of the present application, illustrate the types of self-attaching female fasteners available from the Assignee of this application.

Self-attaching female fasteners may alternatively be utilized as pierce or clinch nuts, wherein pierce nuts pierce an opening in the panel and clinch nuts are installed in a pre-pierced panel opening. The self-attaching fasteners illustrated in the above-referenced patents are formed by rolling, wherein a metal wire is progressively rolled into a nut strip having the cross-section of the desired fastener, the strip is then pierced, forming the nut bore, and the rolled section is then chopped or severed to provide the desired length. The nut bore is then generally tapped and the self-attaching female fastener is ready for installation as described above. Such fasteners are presently used in mass production applications, such as used by the automotive and appliance industries. The pierce nuts disclosed in the above-referenced U.S. Pat. Nos. 3,648,747 and 3,711,931 have superior performance characteristics including improved push-off strength and provide a flush mounting on the panel. The improved push-off strength is provided by the parallel "re-entrant" grooves in the flange portions adjacent the pilot portion. As used herein, a "re-entrant" groove includes a bottom wall and relatively inclined side walls, wherein the entrance to the groove at the flange portion has a width which is smaller than the width of the bottom wall of the groove providing a more secure retention of the panel deformed into the groove. The panel is deformed into the groove by a die member or die button having parallel lips which deform the panel against the bottom wall of the grooves and beneath the inclined side wall or walls of the grooves. In one preferred embodiment, both side walls of the grooves are relatively inclined forming parallel dovetail-shaped grooves providing superior performance. However, a re-entrant groove may have only one inclined side wall, preferably the outer groove side walls furthest from the pilot.

As will be understood by those skilled in this art, the self-attaching fasteners described above formed by rolling are limited in shape. That is, the rolled nut must be generally rectangular including a rectangular pilot portion having a rectangular end face and rectangular flange portions on opposed sides of the pilot portion, each having an end face generally spaced below the end face of the pilot portion and the parallel re-entrant grooves are formed in the flange portions adjacent the pilot portion. However, in certain applications, it would desirable for a pierce nut to have a round or generally cylindrical pilot portion and a flange portion which surrounds the pilot portion, which cannot be presently formed by conventional roll forming techniques.

The method of forming the self-attaching female fastener element of this invention is disclosed in a co-pending application filed concurrently herewith. The self-attaching female fastener element of this invention is particularly suitable for applications requiring a seal between the female fastener and the panel following installation, such as an oil or transmission pan nut as disclosed herein. The method of this invention forms a sealed joint between the female fastener and the panel assembly and may be installed in a panel by a conventional die press with one stroke of the die press as further disclosed below.

SUMMARY OF THE INVENTION

The method of forming a sealed female fastener and panel assembly of this invention utilizes a female fastener including an annular pilot portion having an annular end face, a bore extending through the pilot portion through the end face, an annular flange portion surrounding the pilot portion having an annular end face parallel to the plane of the end face of the pilot portion and an annular groove in the flange portion having a bottom wall and relatively inclined side walls or an annular re-entrant groove as described above. In one preferred embodiment, the plane of the end face of the flange portion is spaced below the plane of the annular end face of the pilot portion. The method of this invention includes driving an annular lip of a die member against a panel engaging the annular end face of the pilot portion, wherein the annular lip of the die member has an inner diameter less than an outer diameter of the annular end face of the pilot portion and an outer diameter less than an inner diameter of the annular outer side wall of the annular groove. The annular lip of the die member thus pierces a slug from the panel having a diameter less than an outer diameter of the annular end face of the pilot portion and forms an opening through the panel. In a preferred embodiment, the annular lip of the die member includes a generally cylindrical inner surface, such that a panel slug is pierced between the cylindrical inner surface and the annular end face of the pilot portion, a planar annular end face and an annular arcuate outer face.

The method of this invention then includes continuing to drive the annular end face of the annular lip of the die member against a panel portion surrounding the opening pierced in the panel and against an outer periphery of the annular end face of the pilot portion, thereby shaving an integral annular outer portion of the pilot portion against an opposed or upper portion of the panel portion being deformed into the annular re-entrant groove.

Finally, the annular end face of the lip of the die member is driven against a panel portion surrounding the panel opening, which deforms the panel portion against the annular bottom wall of the annular re-entrant groove and radially beneath the inclined outer side wall of the annular groove. The shaved annular outer portion of the pilot portion is then driven against the opposed inner portion of the panel forming a secure sealed joint between the female fastener element and the panel. The resultant panel assembly thus includes a first annular panel portion supported by the annular end face of the flange portion, a second annular portion deformed around the annular inclined outer side wall of the annular groove into the groove and a third integral annular portion which is deformed against the bottom wall of the groove by the annular lip of the die member as described above. In the preferred embodiment, wherein the inclined outer side wall of the groove is arcuately inclined, the second annular panel portion conforms to the arcuate annular shape of the outer side wall of the groove. Further, because the pilot portion is shaved by a cylindrical inner surface of the annular die lip, the pilot portion above the third panel portion is cylindrical and the portion shaved from the pilot portion includes an arcuate surface deformed against and into the inner edge of the third annular panel portion.

The disclosed embodiment of the self-attaching female fastener element of this invention thus includes a generally cylindrical central pilot portion including an annular generally planar end face, a bore extending through the pilot portion through the end face, an annular flange portion surrounding the pilot portion having a generally planar end face which may be spaced below the end face of the pilot portion and an annular re-entrant groove in the flange portion surrounding the pilot portion including a bottom wall and relatively inclined inner and outer side walls defining an annular re-entrant groove. In the disclosed embodiment, the outer side wall of the annular re-entrant groove is arcuately inclined radially inwardly toward the pilot portion from adjacent the bottom wall to adjacent the end face of the flange portion and the inner side wall is arcuately inclined radially outwardly from adjacent the bottom wall to the level or plane of the annular end face of the flange portion and the exposed outer surface of the pilot portion may be generally cylindrical. In one preferred embodiment, the bottom wall includes annular arcuate surfaces adjacent the inner and outer side walls providing a smooth transition between the inner and outer side walls and the bottom wall.

Other advantages and meritorious features of the method of forming a sealed female fastener and panel assembly, the resultant female fastener and panel assembly and self-piercing female fastener of this invention will be more fully understood from the following description of the preferred embodiments, the appended claims and the drawings, a brief description of which follows.

DESCRIPTION OF THE PREFERRED EMBODIMENTS

As set forth above, this invention relates to a self-attaching female fastener which may be utilized as a pierce or clinch nut, a method of attaching or installing a self-attaching female fastener in a panel and a sealed female fastener and panel assembly. As will be understood, this disclosure of the preferred embodiments are for purposes of illustration only and various modifications may be made to the self-attaching female fastener, method of installation and assembly of this invention within the purview of the appended claims as discussed further below. The embodiment of the self-attaching female fastener 20 illustrated in FIGS. 1, 2, 2A and 7 may be utilized as a self-piercing female fastener or pierce or clinch nut as described below with regard to the method of installation in a panel.

Figure 1:
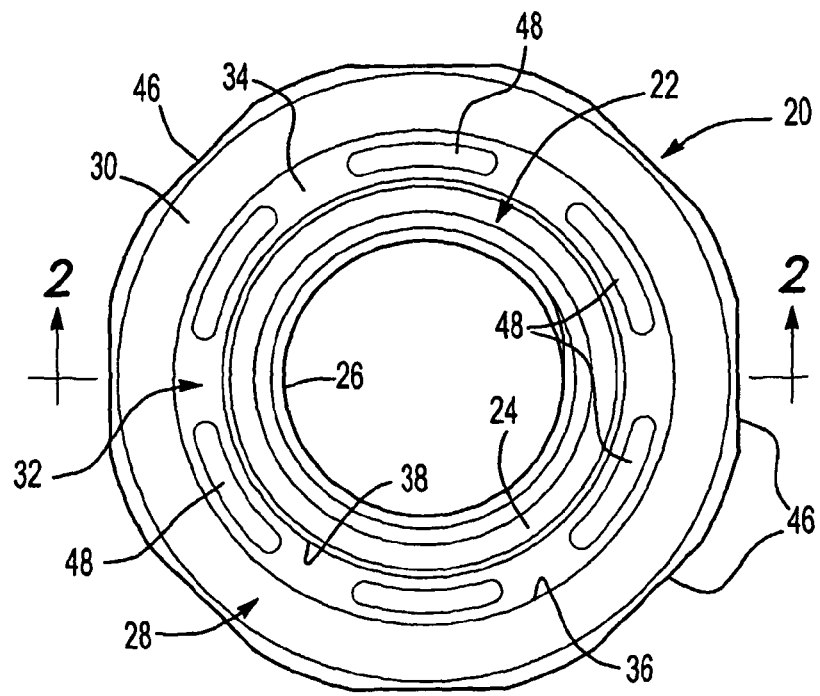
FIG. 1 is a top view of one embodiment of the self-attaching female fastener of this invention.
Figure 2:
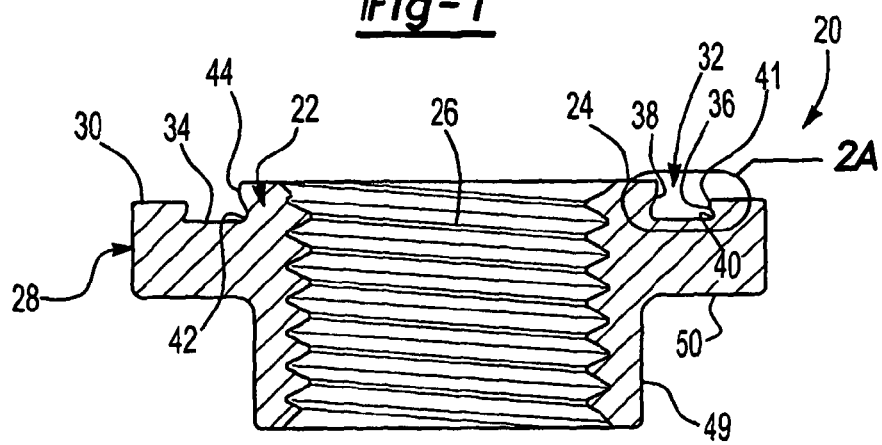
FIG. 2 is a side cross-sectional view of the female fastener element shown in FIG. 1 in the direction of view arrows 2-2.
Figure 2A:
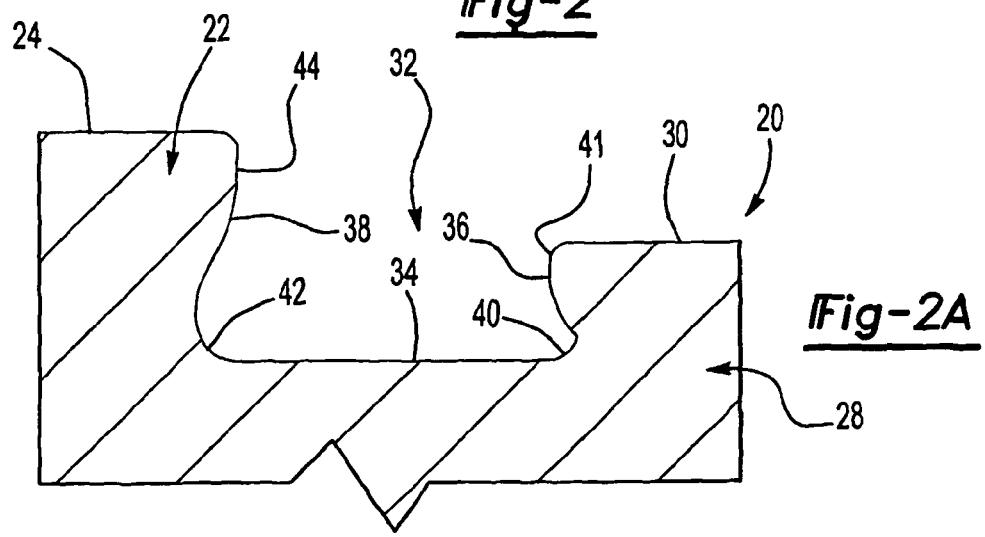
FIG. 2A is an enlarged partial cross-sectional view of FIG. 2.

The self-attaching female fastener 20 illustrated in FIGS. 1 and 2 includes a central annular generally cylindrical pilot portion 22 having a generally planar annular end face 24, a bore 26 through the pilot portion 22 through the annular end face 24, an annular flange portion 28 surrounding the pilot portion 22 having a generally planar annular end face 30 and an annular re-entrant groove 32 surrounding the pilot portion 22. In the disclosed embodiment, the annular re-entrant groove 32 includes a bottom wall 34, an annular outer wall 36 radially inclined toward the pilot portion 22 and an annular inner side wall 38 inclined radially outwardly from adjacent the bottom wall toward the flange portion 28. As set forth above, the term "re-entrant groove" means that the entrance to the annular groove 32 at the end face 30 of the flange portion 20 has a radial width less than the width of the bottom wall 34 providing improved retention when installed in a panel as described below. In a preferred embodiment, the annular outer wall 36 is inclined to provide a re-entrant groove. However, in the disclosed embodiment, the re-entrant groove 32 further includes an inner groove wall 38 inclined from adjacent the bottom wall 34 toward the pilot portion and the end portion 44 which projects above the plane of the end face 30 of the flange portion is generally cylindrical as shown in FIGS. 2 and 2A. The annular re-entrant groove 32 in the disclosed embodiment is thus dovetail-shaped providing improved retention when installed in a panel.

As shown more clearly in FIG. 2A, which is an enlarged cross-sectional view of the re-entrant groove 32 of the self-piercing female fastener element 20, the outer side wall 36 of the annular re-entrant groove is arcuately inclined radially inwardly from adjacent the bottom wall 34 and the inner groove wall 38 is arcuately inclined from adjacent the bottom wall 34 radially inwardly and includes an arcuate surface or fillet 40 between the bottom wall 34 and the arcuately inclined outer side wall 36. Further, the arcuately inclined outer side wall 36 includes an arcuate fillet 41 which blends into the annular end face 30 of the annular flange portion 28. Similarly, the inner side wall 38 of the annular re-entrant groove 32 is arcuately inclined from adjacent the bottom wall 34 radially outwardly toward the annular flange portion 28 to the generally cylindrical end portion 44 and includes an arcuate inner surface 42 which projects above the annular end face 24 of the annular flange portion 28. The arcuate surfaces, particularly the arcuately inclined outer side wall 36 and the arcuate fillets 40 and 41 provide improved metal flow of the panel during installation, which is advantageous when forming a sealed fastener and panel assembly as described below. As shown in FIG. 1, this embodiment of the self-attaching female fastener element 20 further includes polygonal flat surfaces 46 and the bottom wall 34 of the annular re-entrant groove 32 includes circumferentially spaced arcuate protrusions 48 which prevent or inhibit rotation of the female fastener element 20 on a panel following installation. The disclosed embodiment of the female fastener element 20 further includes an integral tubular portion 49 as shown in FIG. 2, which is concentric with the pilot portion 22. In the disclosed embodiment, the bore 26 is internally threaded or tapped. However, the bore may also be cylindrical for receipt of a thread forming or thread rolling male fastener element (not shown).

Figure 3:
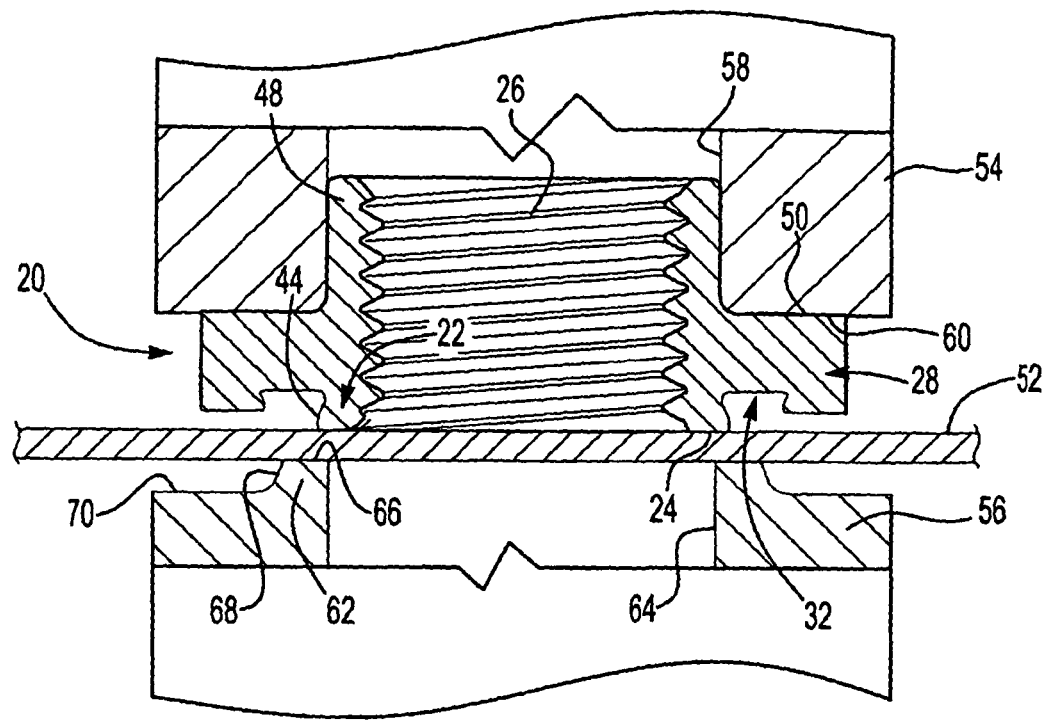
FIG. 3 is an enlarged partial side cross-sectional view of the female fastener shown in FIGS. 1 and 2 with installation tooling as the female fastener is driven against a panel.

As described above, self-attaching fastener elements are conventionally installed in a die press (not shown), wherein an installation head (not shown) is installed in the upper die shoe of the die press and a die member or die button is installed in the lower die shoe. As shown in FIG. 3, the self-attaching female fastener 20 of this invention utilized as a pierce nut is presented to a panel 52 by a plunger 54, generally reciprocable in the installation head (not shown), wherein the panel 52 is supported on a die button 56. The plunger 54 includes a tubular end portion having a bore 58 configured to receive the tubular end portion 48 of the female fastener 20 and a planar annular end portion 60 which is driven against the back face 50 of the flange portion 28. The die button 56 includes a projecting annular lip portion 62 including a cylindrical bore 64 having an internal diameter less than the external diameter of the generally cylindrical end portion 44 of the pilot portion 22, an annular planar end face 66 and an arcuately inclined outer face 68 including a diameter less than the minor diameter of the inclined outer side wall 36 of the annular re-entrant groove 32. The die button further includes an annular planar die face circumscribing the projecting annular lip 62. As shown in FIG. 3, the annular pilot portion 22 is coaxially aligned with the projecting annular lip 62 of the die button as the plunger 54 drives the self-piercing female fastener 20 against the panel 52.

Figure 4:
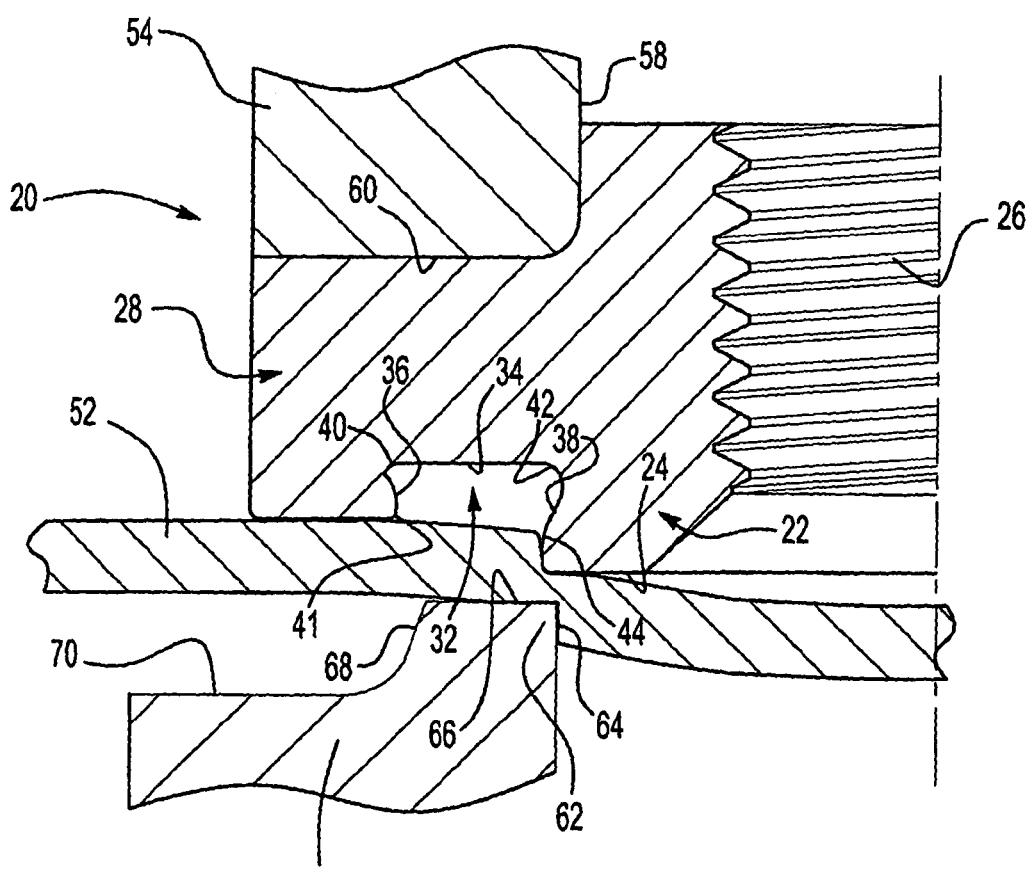
FIG. 4 is a partial cross-sectional view of the female fastener and installation tooling during the initial piercing of the panel.
Figure 5:
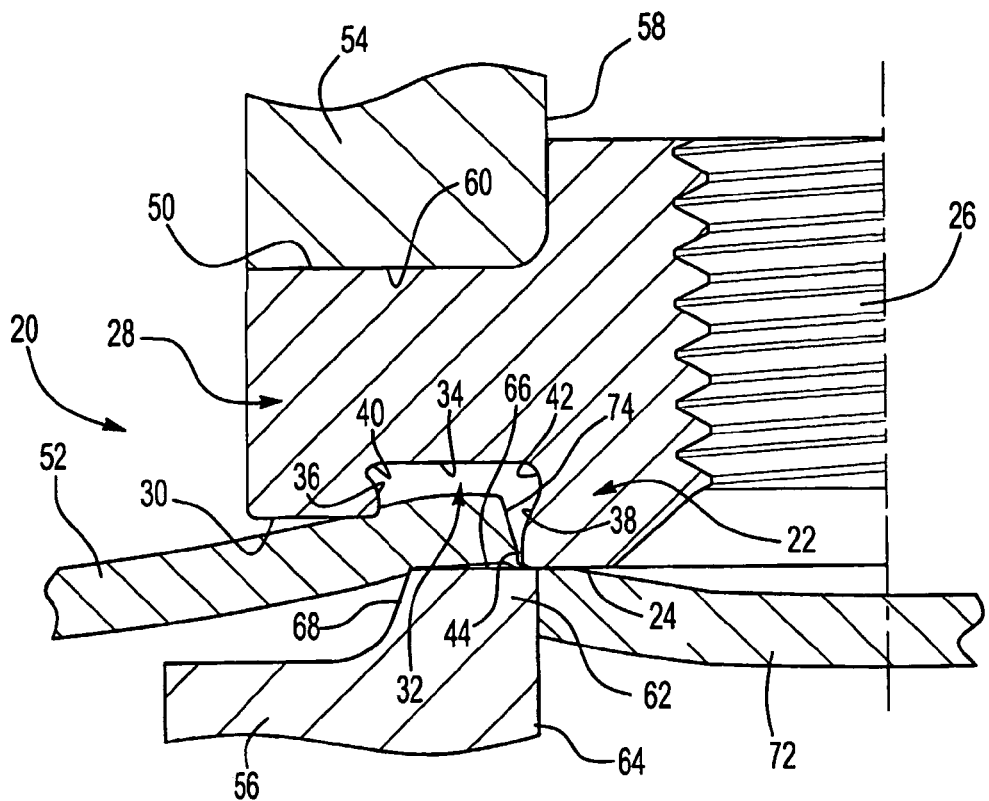
FIG. 5 is a partial cross-sectional view similar to FIG. 4 illustrating a further sequence in the method of installation.
Figure 6:
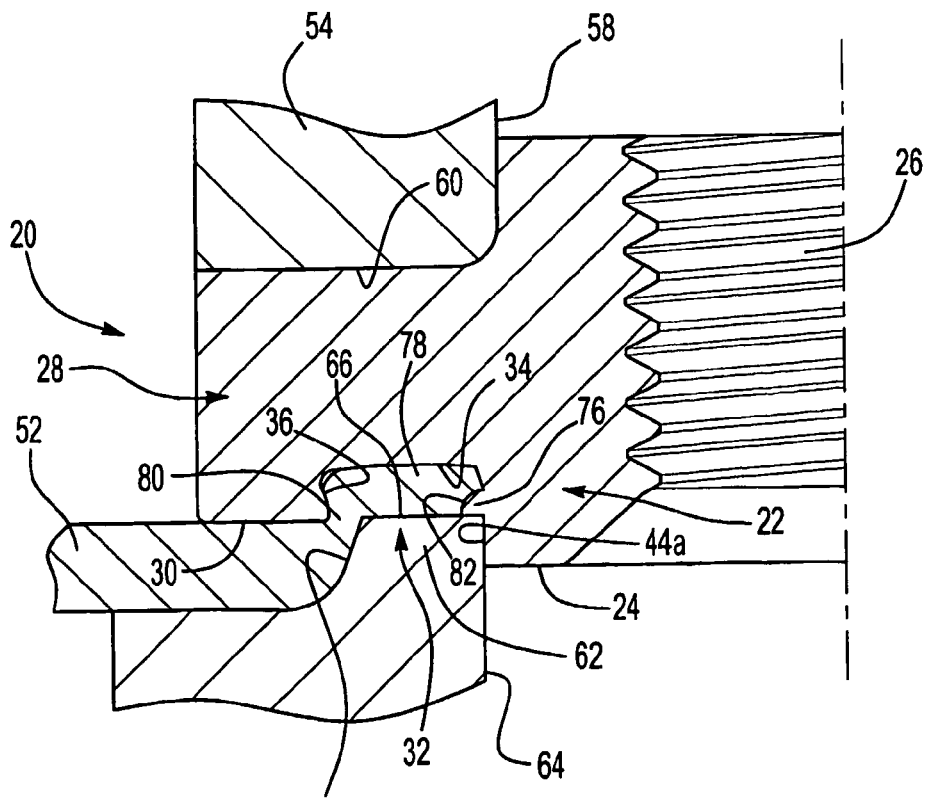
FIG. 6 is a side partially cross-sectioned side view similar to FIGS. 4 and 5 following installation of the female fastener in a panel.
Figure 7:
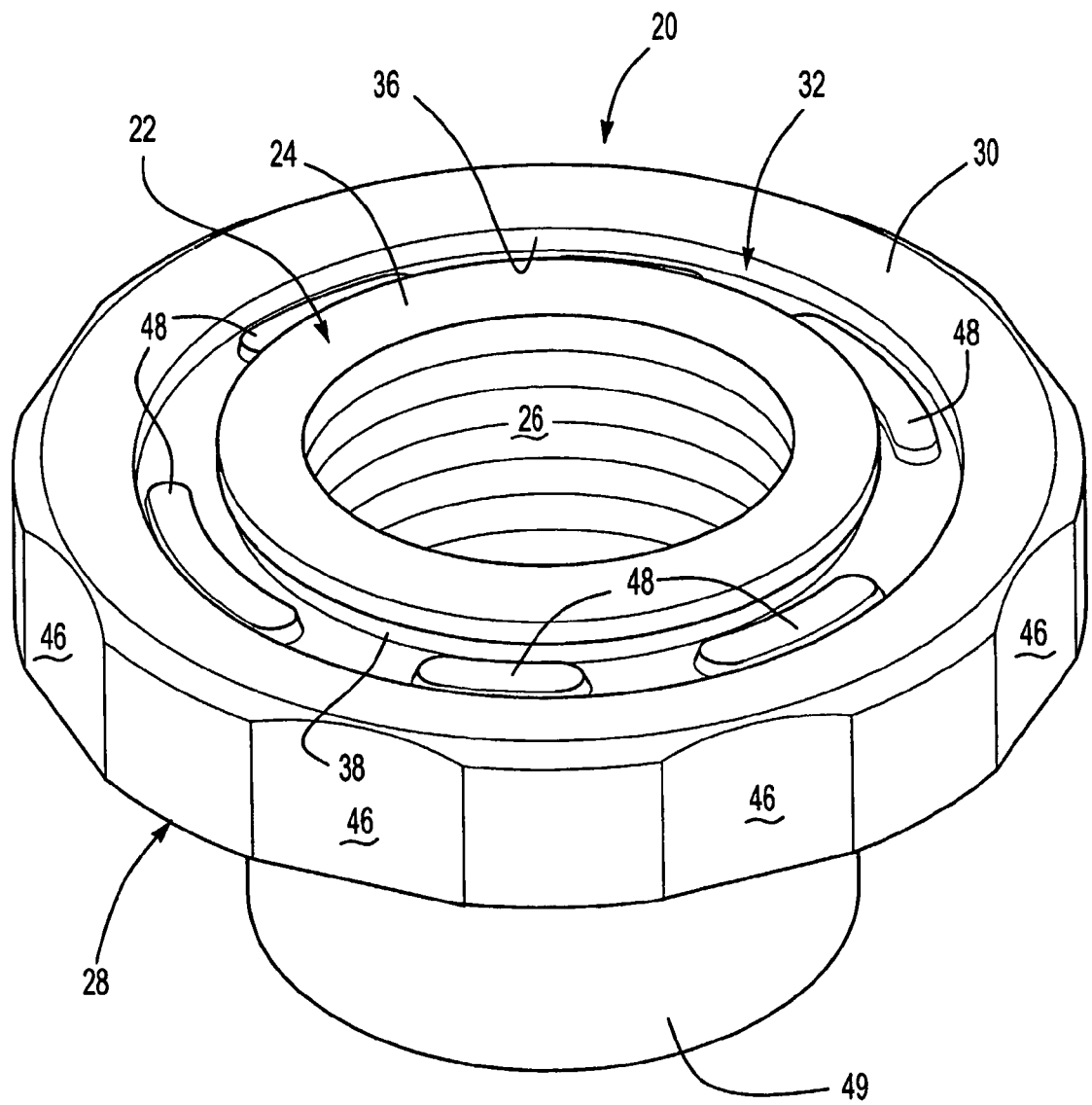
FIG. 7 is a top perspective view of perspective view of the female fastener.

As shown in FIG. 4, the panel 52 is then pierced between the intersection of the cylindrical bore 64 and the planar annular end face 66 of the die button 56 and the cylindrical outer surface 44 of the pilot portion 22 partially piercing a slug from the panel 52. As shown in FIG. 5, the panel is then pierced forming a circular slug 72 and a circular opening 74 in the panel 52 which is received in the bore 58 of the die button 56. FIG. 5 further illustrates the dimensional relation between the annular lip 62 of the die button and the pilot portion 22 of the self-piercing female fastener element 20, wherein the internal diameter of the bore 64 of the annular lip 62 is less than the external diameter of the cylindrical end portion 44 of the pilot portion 22 and the arcuately inclined outer face 68 has a minor outer diameter less than the major inner diameter of the arcuately inclined outer side wall 36 of the re-entrant groove. Thus, upon continued driving of the female fastener element 20 against the die button 56 by the plunger 54, the annular end face 66 of the die button 56 shaves an annular portion 76 (FIG. 6) from the outer periphery of the pilot portion 22, forming an integral annular radially inwardly extending portion or protrusion 76 which overlies the annular panel portion 78 as shown in FIG. 6. Simultaneously, the annular lip 62 of the die button 56 is driven against the annular panel portion 78, and the panel portion 78 is driven against the bottom wall 34 of the annular re-entrant groove 32, which deforms the annular panel portion radially beneath the arcuately inclined outer side wall 36 of the annular re-entrant groove.

FIG. 6 also illustrates the female fastener and panel assembly of this invention. As best shown in FIG. 6, the panel 52 includes a first annular portion overlying and contacting the annular end face 30 of the flange portion, a second annular portion 80 which is deformed around the arcuately inclined outer side wall 36 of the annular re-entrant groove in close contact and simultaneously thinned, as shown, and a third annular panel portion 78 which is deformed against the bottom wall 34 of the re-entrant groove and deformed radially beneath the arcuately inclined outer side wall 36 of the re-entrant groove as shown. The annular radial protrusion 76, which is shaved from the periphery of the generally cylindrical end portion 44 of the pilot portion 22, has an arcuate surface 82 which is deformed into the annular panel portion 78 and the shaved surface 44a of the pilot portion is cylindrical. The resultant female fastener and panel assembly shown in FIG. 6 has superior push-off strength and the joint is sealed. The female fastener 20 is thus self-piercing and provides superior performance for applications requiring a seal between the female fastener 20 and the panel 52, such as an oil pan or transmission pan nut or bung for a liquid container. Where torque resistance is desired, the bottom wall 34 of the re-entrant groove may include various anti-rotation means, such as the circumferentially spaced arcuate protrusions 48 shown in FIGS. 1 and 7, wherein the panel portion 78 deformed against the bottom wall of the groove conforms to the shape of the anti-rotation means preventing rotation of the female fastener 20 on the panel 52 as shown in FIG. 6. The female fastener and panel assembly also results in a flush mounting of the female fastener 20 on the panel 52 as shown in FIG. 6, such that a bracket or other panel (not shown) may be secured to the female fastener and panel assembly without embossing the second panel. Further, the annular re-entrant groove 32 provides superior push through and push-off performance over conventional fasteners.

As will be understood by those skilled in the art, various modifications may be made to the self-attaching female fastener element, panel assembly and method of installation of this invention within the purview of the appended claims. For example, as set forth above, the female fastener bore 26 may be cylindrical and unthreaded for receipt of a thread forming or thread rolling male fastener element. Further, the re-entrant groove may include only one inclined wall, preferably the outer groove wall as discussed above. Various torque resistant means may also be utilized including, for example, radial depressions or protrusions in the groove bottom wall or the annular end or bearing face 30 of the female fastener element may include radial depressions or protrusions. As used herein, the term "annular" is not limited to circular; however, the pilot portion is preferably generally cylindrical, as shown and described. The invention is now claimed, as follows. The self-attaching female fastener of this invention may also be utilized as a clinch nut and form a sealed fastener and panel assembly, wherein the opening 74 through the panel 52 is preformed in the panel prior to driving the pilot portion 24 against the annular lip 62 of the die button 56 as shown in FIGS. 5 and 6. Finally, in certain applications, it is desirable to have the annular end face 30 of the annular end face 30 of the flange portion flush with the annular end face 24 of the pilot portion 22 rather than spaced below the plane of the annular end face 24 as shown in the drawings.

The invention claimed is:

1. A method of forming a sealed female fastener and panel assembly, said female fastener including an annular pilot portion having an annular end face, a bore extending through said pilot portion through said end face, an annular flange portion surrounding said pilot portion having an annular end face parallel to said end face of said pilot portion, and an annular groove in said flange portion having a bottom wall and relatively inclined side walls including an outer side wall and an inner side wall inclined radially outwardly from adjacent said bottom wall, said bottom wall defining anti-rotation features extending from said bottom wall and spaced from said inclined side walls, said method comprising the following steps:

driving an annular lip of a die member against a panel engaging said annular end face of said pilot portion, said annular lip having an inner diameter less than an outer diameter of said annular end face of said pilot portion and an outer diameter less than an inner diameter of said outer side wall of said annular groove, thereby piercing a slug from said panel having a diameter less than said outer diameter of said annular end face of said pilot portion and forming an opening through said panel;

continuing to drive said annular lip of said die member against a panel portion surrounding said opening in said panel and against an outer periphery of said annular end face of said pilot portion, thereby shaving an annular outer portion of said pilot portion generating an annular radial protrusion continuously against an inner portion of said panel portion; and continuing to drive said annular lip of said die member against said panel portion and said annular outer portion of said pilot portion and deforming said pilot portion against said bottom wall of said annular groove and said anti-rotation features being spaced from said inclined side walls, thereby deforming said panel portion radially inwardly and outwardly entrapping said panel portion in said annular groove and sealing said female fastener on said panel as said panel is deformed against said bottom wall to conform to the shape of said anti-rotation features thereby preventing rotation of said female fastener on said panel.

2. The method of forming a sealed female fastener and panel assembly as defined in claim 1, wherein said outer side wall of said annular groove is inclined radially inwardly and said panel portion is integral with a remainder of said panel, said method including deforming said panel portion radially outwardly beneath said inclined outer side wall of said annular groove.

3. The method of forming a sealed female fastener and panel assembly as defined in claim 2, wherein said outer side wall of said annular groove is arcuately inclined radially outwardly, said method including deforming said panel around said arcuately inclined surface of said outer side wall of said annular groove.

4. A method of forming a sealed female fastener and panel assembly, said female fastener including a generally cylindrical pilot portion having an annular planar end face, a bore extending through said pilot portion through said annular planar end face, an annular flange portion surrounding said pilot portion having an annular end face parallel to said end face of said pilot portion, and an annular groove in said flange portion having a bottom wall and relatively inclined side walls including an outer side wall inclined inwardly from said bottom wall toward said pilot portion and an inner side wall inclined radially outwardly from adjacent said bottom wall toward said flange portion, said bottom wall defining anti-rotation features extending from said bottom wall and spaced from said inclined side walls, said method comprising the following steps:

driving an annular lip projecting from a die member through an opening in a panel supported on said annular end face of said flange portion, said annular lip having a generally planar annular end face, a generally cylindrical inner surface having an inner diameter less than an outer diameter of said annular end face of said pilot portion and an outer diameter less than an inner diameter of said outer side wall of said annular groove;

continuing to drive said annular lip of said die member against said annular end face of said pilot portion and an annular panel portion surrounding said opening in said panel, thereby shaving an annular outer portion of said pilot portion generating an annular radial protrusion continuously against said panel portion; and continuing to drive said annular lip of said die member against said outer portion of said pilot portion and said panel portion against said bottom wall of said annular groove, thereby deforming said panel portion radially and deforming said annular outer portion of said pilot portion against said panel portion, thereby entrapping said panel portion in said annular groove between said anti-rotation features and said inclined side walls, and sealing said female fastener on said panel as said panel is deformed against said bottom wall to conform to the shape of said anti-rotation features thereby preventing rotation of said female fastener on said panel.

5. The method of forming a sealed female fastener and panel assembly as defined in claim 4, wherein said outer side wall of said annular groove is arcuately inclined toward said pilot portion, said method including deforming a second annular panel portion around said arcuately inclined outer side wall of said annular groove.

6. The method of forming a sealed female fastener and panel assembly as defined in claim 4, wherein said method includes deforming said panel portion radially outwardly beneath said inclined outer side wall of said annular groove.

* * * * *